United States Patent
Fathollahi et al.

(10) Patent No.: US 9,928,614 B2
(45) Date of Patent: *Mar. 27, 2018

(54) DISTANCE MARKER AND MOBILE DEVICE CASE FOR DISTANCE MEASUREMENT

(71) Applicant: INCIPIO, LLC, Irvine, CA (US)

(72) Inventors: Andy Fathollahi, Corona Del Mar, CA (US); David L. Zermeno, Long Beach, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,843

(22) Filed: Jan. 13, 2017

(65) Prior Publication Data

US 2017/0148188 A1 May 25, 2017

Related U.S. Application Data

(63) Continuation of application No. 14/944,023, filed on Nov. 17, 2015, now Pat. No. 9,548,784, which is a continuation of application No. 14/254,853, filed on Apr. 16, 2014, now Pat. No. 9,197,275.

(60) Provisional application No. 61/813,021, filed on Apr. 17, 2013.

(51) Int. Cl.
| | |
|---|---|
| *H04B 1/3888* | (2015.01) |
| *G06T 7/73* | (2017.01) |
| *H04M 1/02* | (2006.01) |
| *H04N 5/232* | (2006.01) |
| *G01C 11/02* | (2006.01) |

(52) U.S. Cl.
CPC ........... *G06T 7/74* (2017.01); *G01C 11/02* (2013.01); *H04B 1/3888* (2013.01); *H04M 1/0264* (2013.01); *H04N 5/23293* (2013.01); *H04M 2250/52* (2013.01)

(58) Field of Classification Search
CPC ..................................... H04B 1/3888
See application file for complete search history.

(56) References Cited

U.S. PATENT DOCUMENTS

| | | | | |
|---|---|---|---|---|
| 5,255,045 A * | 10/1993 | Nonaka | ............... | G02B 7/32 250/201.6 |
| 5,433,014 A * | 7/1995 | Falk | ............... | G01B 3/1061 33/755 |
| 7,237,340 B2 * | 7/2007 | Johnson | ............... | B26B 11/008 235/462.03 |
| 9,509,803 B2 * | 11/2016 | Soon-Shiong | ............... | H04L 67/42 |
| 2004/0110526 A1 * | 6/2004 | Volland | ............... | H04M 1/0202 455/550.1 |
| 2008/0064339 A1 * | 3/2008 | Cavalier | ............... | F41H 9/10 455/66.1 |
| 2010/0092079 A1 * | 4/2010 | Aller | ............... | G06K 9/3216 382/165 |

(Continued)

*Primary Examiner* — Christopher M Brandt
(74) *Attorney, Agent, or Firm* — Manatt, Phelps & Phillips, LLP

(57) ABSTRACT

A mobile device case or cover can include a distance marker for distance measurement. A mobile device coupled with the case may include a measurement application or module that can acquire video or still images of the distance marker. The measurement application can calculate a distance to the distance marker based on a captured image of the distance marker in the video or still images. The mobile device case can include a pocket, slot, or storage compartment for storing the distance marker.

11 Claims, 10 Drawing Sheets

(56) References Cited

U.S. PATENT DOCUMENTS

| | | | |
|---|---|---|---|
| 2011/0192857 A1* | 8/2011 | Rothbaum | B25F 1/00 220/694 |
| 2012/0088526 A1* | 4/2012 | Lindner | H04M 1/72522 455/457 |
| 2013/0012264 A1* | 1/2013 | Mitsunaga | G01C 21/20 455/556.1 |
| 2013/0029730 A1* | 1/2013 | Harada | H04M 1/72522 455/566 |
| 2015/0133190 A1* | 5/2015 | Fisher | H04M 1/6066 455/556.1 |

* cited by examiner

DISTANCE MARKER AND MOBILE DEVICE CASE FOR DISTANCE MEASUREMENT

INCORPORATION BY REFERENCE TO RELATED APPLICATION

This application is a continuation of U.S. application Ser. No. 14/944,023, filed Nov. 17, 2015, which is a continuation of U.S. application Ser. No. 14/254,853, filed Apr. 16, 2014, which claims benefit under 35 U.S.C. § 119(e) from U.S. Provisional Application No. 61/813,021, filed on Apr. 17, 2013. All of the above applications are hereby incorporated herein by reference in their entirety and are to be considered a part of this specification.

BACKGROUND

With each new generation, portable electronic devices provide greater functionality and have more capabilities. These portable electronic devices allow people to play and record music, send and receive e-mail, send text messages, browse Web pages, make phone calls, play and record video, take and view pictures, edit documents, and much more. These devices continue to revolutionize the way people interact, learn, connect with other people, conduct business, and find information. They help people manage their daily lives and can be a source of entertainment. These devices can be used to store valuable information including personal information, such as phone numbers, financial information, private photos or videos, and favorite music tracks.

Typically these devices are intended to be carried or moved about. As such, these devices are more vulnerable to damage as compared to non-portable devices. Portable electronic devices are more likely to be accidentally dropped, hit, scratched, or water damaged. While some types of damage may be cosmetic (e.g., scratches), other types of damage may ruin or limit the functionality of the device. Often these devices contain sensitive and fragile components (e.g., screen, camera lens, flash memory, processors, accelerometers, and sensors). Accidentally dropping the device could render various features unusable. Accordingly, protective cases are often used to protect these devices from possible damage.

SUMMARY

For purposes of summarizing the disclosure, certain aspects, advantages and novel features of several embodiments have been described herein. It is to be understood that not necessarily all such advantages can be achieved in accordance with any particular embodiment of the features disclosed herein. Thus, the embodiments disclosed herein can be embodied or carried out in a manner that achieves or optimizes one advantage or group of advantages as taught herein without necessarily achieving other advantages as can be taught or suggested herein. It should be understood that the various aspects, or features of the embodiment, herein may be combined.

In certain embodiments, a mobile device assembly includes a mobile device case that can at least partially cover a mobile device and a distance marker that can be coupled with the case. The distance marker can include an image that can be detected by a measurement module for calculating a distance from the mobile device to the distance marker.

In various embodiments, a mobile device assembly includes a distance marker having an image and a measurement module or application that can be implemented by a mobile device and that can detect the image of the distance marker. The measurement module or application can include a distance calculator that can calculate a distance from the mobile device to the distance marker.

In other embodiments, a mobile device assembly includes a mobile device case that can at least partially cover a mobile device and a measurement application that can be implemented by the mobile device and that can detect an image associated with the mobile device case. The measurement application can include a distance calculator that can calculate a distance from the mobile device to the image.

BRIEF DESCRIPTION OF THE DRAWINGS

Throughout the drawings, common reference numbers are used to indicate correspondence between referenced elements. The drawings are provided to illustrate embodiments of the features described herein and not to limit the scope thereof.

DETAILED DESCRIPTION

I. Introduction

In addition to protecting a mobile device, protective cases or covers can also enhance the functionality of the mobile device. Many cases, for instance, include a kick-stand or fold into a shape that permits the mobile device to be propped up into a more comfortable typing position. Other cases can hold a stylus when a stylus is not being used by a user.

This disclosure describes embodiments of a mobile device case or cover that include a distance marker for distance measurement. A mobile device coupled with the case may include a measurement application or module that can acquire video or still images of the distance marker. The measurement application can calculate a distance to the distance marker based on a captured image of the distance marker in the video or still images. In one embodiment, the mobile device case includes a pocket, slot, or storage compartment for storing the distance marker.

The embodiments disclosed herein are described primarily in the context of a case and distance marker for a mobile phone or smartphone because the embodiments disclosed herein have particular utility in this context. However, the embodiments and features described herein can also be applied to other types of mobile devices, including, but not limited to tablets, laptops (including ultrabooks and netbooks), combination laptop/tablets, electronic book readers (e-readers), personal digital assistants (PDAs), portable game devices and game controllers, music players (e.g., MP3 players), digital cameras, portable digital recorders or Dictaphones, or any other portable electronic device.

II. Example Cases and Distance Marker

Figure 1:
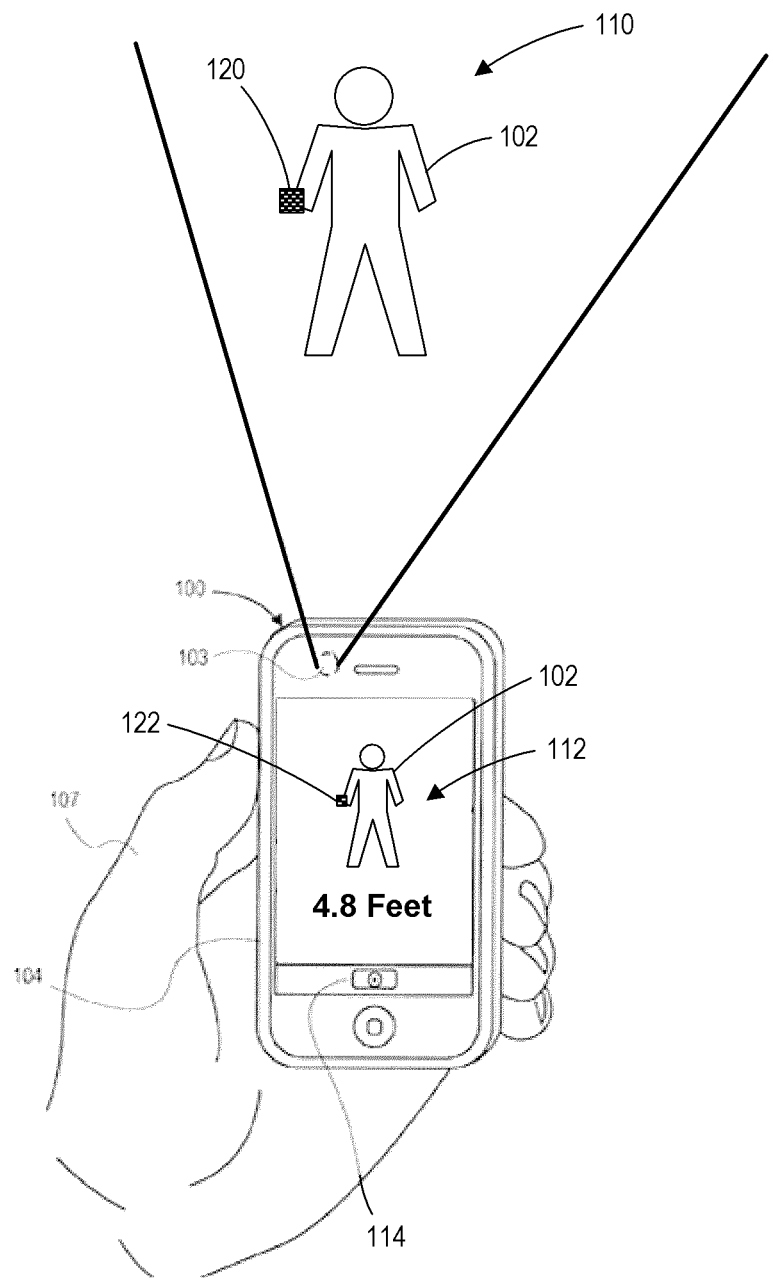
FIG. 1 depicts an embodiment of a mobile device configured to measure distance.

FIG. 1 depicts an embodiment of a mobile device 100 configured to measure distance. In the depicted embodiment, the mobile device 100 is a mobile phone, such as a smartphone or the like, that can include a camera 103 that is able to take video or still images of a scene 110. In the example scene 110 shown, a person 102 is holding a distance marker 120. A camera 103 in the mobile device 100 (shown in phantom to represent that the camera may be on the back of the mobile device 100) captures and produces a picture or visual representation of the scene 110 for output to a display 112 of the mobile device.

In certain embodiments, the mobile device 100 includes or accesses a measurement application that analyzes the image or video obtained by the camera 103 to detect the distance marker 120. In the depicted display 112 of the mobile device 100, an image 122 of the distance marker 120 is shown in a hand of the person 102. The measurement application can analyze the image 122 of the distance marker 120 in comparison to a stored image of the distance marker 120 to ascertain a distance from the mobile device 100 to the distance marker 120. In the depicted embodiment, the display 112 outputs a distance of 4.8 feet from the mobile device 100 to the distance marker 120.

A user interface control (or button) 114 on the display 112 enables a user to initiate distance measurement by pressing the button 114. In an embodiment, the mobile device 100 includes a touch screen display 112, in which case the button 114 may be a touch screen button 114. User selection of the touch screen button 114 can cause the measurement application to obtain video or a still image of the scene 110 and calculate a measurement from the mobile device 100 to the distance marker 120 in the scene 110.

In an embodiment, the measurement application analyzes captured video from the camera 103 to calculate the distance dynamically as a user 107 moves the mobile device 100 relative to the scene 110. For example, as the user 107 moves the mobile device 100 toward the scene 110, the measurement application can calculate a decreasing distance to the marker 120 (assuming that the marker 120 stays in the same position). Likewise, as the user 107 moves the mobile device 100 away from the scene 110, the measurement application can calculate an increasing distance to the marker 120 (assuming that the marker 120 stays in the same position).

In the depicted embodiment, the mobile device 100 is partially covered by a case 104 that can provide protection to at least a portion of the mobile device 100. In an embodiment, the case 104 includes a pocket, slot, or storage compartment for receiving and storing the distance marker 120, enabling a user 107 to easily carry the distance marker 120 together with the mobile device 100. Examples of cases having a slot or pocket for holding the distance marker 120 are described below with respect to FIGS. 2 through 6.

Advantageously, in certain embodiments, the measurement application of the mobile device 100 and the associated distance marker 120 can be used to measure distances of a variety of lengths or ranges. In particular, in some embodiments, the distance marker 120 may be particularly accurate for measuring shorter distances, such as about 2 meters or less, about 4 meters or less, or about 8 meters or less, although longer distances or shorter distances may also be measured with a high degree of accuracy.

In addition, in some embodiments, the measurement application of the mobile device 100 can use a separate long distance algorithm that calculates longer distances to objects. This long distance algorithm does not use the distance marker 120 in some embodiments. Such an algorithm can take into account the height and angle of the camera while the camera is aimed at the base of a target image. The height of the camera may be assumed or may be input by the user, and the angle may be detected by a gyroscope or accelerometer. The measurement application can use trigonometry to detect the distance based on the user's height (which also may be input by the user), the height of the camera 103, and the angle of the camera.

In an embodiment, the measurement application implemented by the mobile device 100 can be implemented in a processor, memory, or other hardware of the mobile device 100. The measurement application is described in greater detail below with respect to FIGS. 7 through 10.

Figure 2:
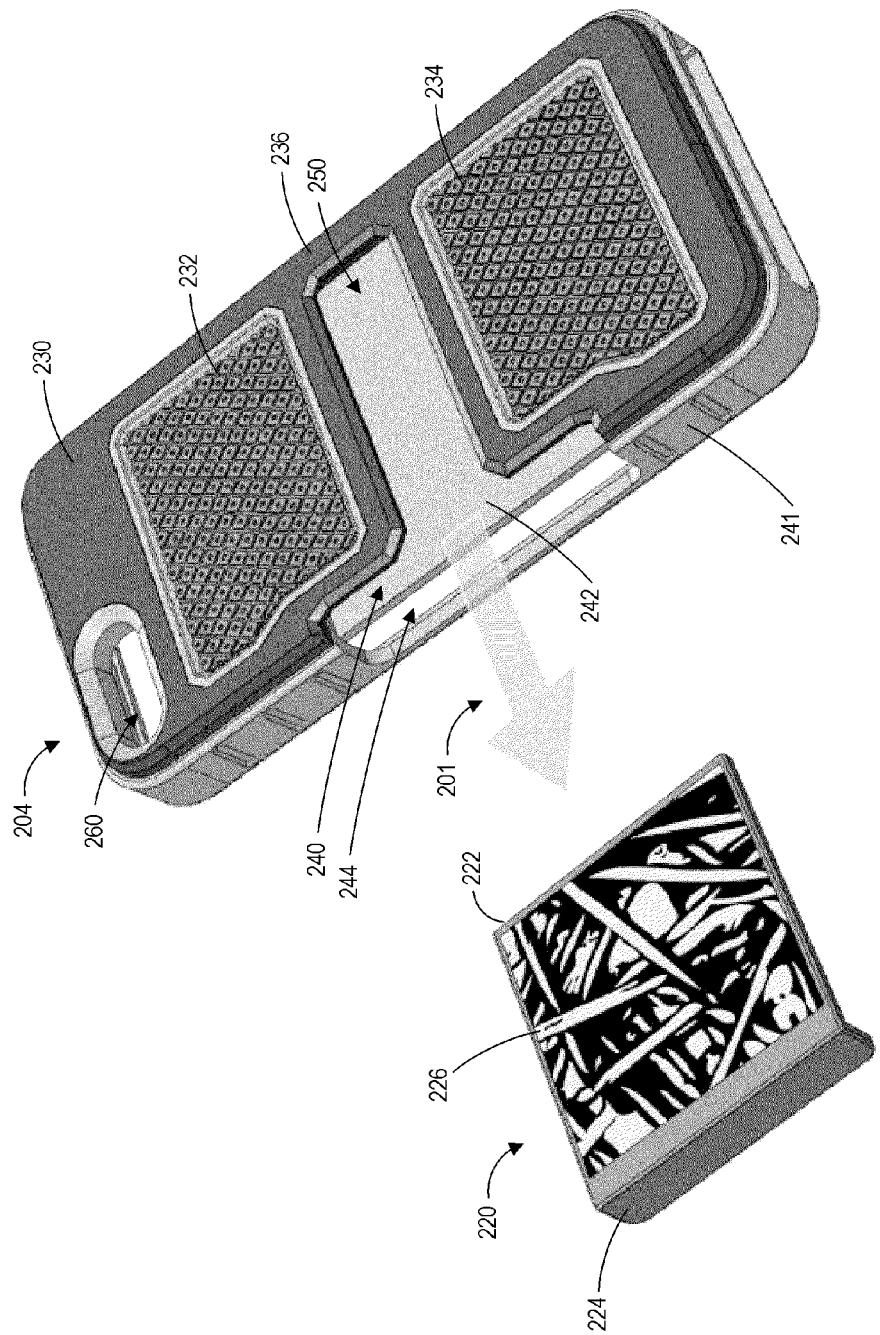
FIG. 2 depicts a side perspective view of an embodiment of a mobile device case and distance marker.

Turning to FIG. 2, a more detailed embodiment of a case 204 and a distance marker 220 are shown. The case 204 corresponds to the case 104 described above, and the distance marker 220 corresponds to the distance marker 120 described above. The case 204 is generally rectangular and shaped to fit a mobile device such as the mobile device 100. In particular, the case 204 is shaped to fit a mobile phone, although the case 204 may be adapted to fit devices other than a phone as described above. When placed inside the case 204, a phone or other mobile device can fit snugly, although the user may still have access to a display and other buttons of the mobile device via cutouts 260 and depressible button covers 270 and 280 (see FIG. 3) of the case 204. Examples of mobile phones for which case 204 may be configured to receive include the iPhone™ available from Apple Computer™, various versions of Android™ phones, and various versions of BlackBerry™ phones.

The case 204 includes four corners defined by a side support 241 and a back panel 230 that includes a top portion 232 and a bottom portion 234. Connecting the top and bottom portions 232, 234 is a connecting portion 236 that has a width less than a width of the top portion 232 and the bottom portion 234. The top portion 232 and bottom portion 234 of the back panel 230 include tactile surfaces that provide a secure grip for a user's hands.

An inner panel 242 together with the back panel 230 desirably form a pocket 240 that is adapted to receive and retain the distance marker 220 for storage. The upper or top portion 232 of the back panel 230 and the bottom portion 234 of the back panel 230 desirably overlap the inner panel 242 to create a slot or pocket 240 into which the marker 220 can be securely stored. A finger cutout 250 defined by the top portion 232, the connecting portion 236 and the bottom portion 234 desirably provides a void or space in which a user may slide his or her finger onto the marker 220 when inserted into the pocket 240 to pull the marker 220 out of the pocket 240 as indicated by the arrow 201 (see also FIG. 3).

The case 204 also desirably includes a side void 244 defined by the side support 241 and the inner panel 242. The side void 244 can receive a base 224 of the marker 220, which base 224 may include one or more magnets for coupling with the side of the mobile device when inserted into the case 204. The side void 244 can therefore facilitate the magnetic coupling of the base 224 of the marker 220 to the mobile device. This magnetic coupling mechanism is described in greater detail below with respect to FIG. 4.

In certain embodiments, the case 204 may be a hard case or a soft case. If the case 204 is a hard case, the case 204 may be made of aluminum, plastic, carbon fiber, or some other hard metal or synthetic material for protection of the mobile device. The case 204 may also be a soft case made of leather or a composite material that is more flexible than a hard case but which still may protect the mobile device. The case 204 can also include both hard and soft materials, for example, with a hard exterior case for shielding from impacts and soft interior lining to absorb impacts.

In an embodiment, the case 204 may be made of a polymeric or plastic material. Such materials may include rubber, silicon, thermoplastic polyurethane ("TPU"), cross-linked ethylene propylene diene class rubber polypropylene polymers such as Santoprene® available from ExxonMobil, and/or other suitable thermoplastic or thermoset elastomeric polymers and copolymers. The case 204 may be made of a material that is suitably flexible to allow a mobile device to be resiliently received and snugly retained within the case 204. Additionally, the case 204 materials alone may be impact resistant enough to resist fracture or permanent deformation when the case 204 containing a mobile device is dropped from a user's hand, a table, a desk, and similar heights onto a variety of surfaces including concrete, asphalt, carpet, and the like. Such a height may include heights such as six feet, five feet, four feet, three feet, and the like.

The marker 220 includes a main body 222 and the base 224 described above. The main body 222 is generally rectangular or square in shape. The base 224 is also generally rectangular in shape. Either the main body 222 or the base 224 may have rounded edges. The base 224 has a width that corresponds to a width of a phone or a mobile device inserted in the case 204. The marker 220 may be made out of any of the same materials used to make the case 204 or may be made of different materials. In an embodiment, the marker 220 is made primarily of plastic.

The main body 222 of the marker 220 includes a tracking image 226 which may be adhered to the main body as a sticker or the like, screen-printed or painted on, and/or integrally formed with the main body 222. The image 226 includes various features that can be detected by an image processing algorithm or module so as to measure distance. In an embodiment, some characteristics of the tracking image 226 include features that are sharp, spiked, or otherwise chiseled details which may be more easily trackable than rounded edges for instance. In addition, rich detail, high contrast, few or no repetitive patterns and evenly distributed features in the tracking image 226 can facilitate easier detection of the tracking image 226 and subsequent measurement. In the depicted embodiment, the tracking image 226 includes a black and white image of grass blades and bark (or approximate versions thereof), which include many features, high contrast, rich detail, and the like. The tracking image 226 can be detected by a variety of image processing modules including, for example, the following image processing modules or augmented reality modules: Vuforia™, Metaio™, D'fusion™, Layar™, and AR Lab™, among others.

In certain embodiments, the pocket 240 defined by the back panel 230 and inner panel 242 can provide a friction fit for the marker 220. Thus, when the marker 220 is slid into the pocket 240, a tight or somewhat tight fit between the inner panel 242 and the back panel 230 can hold the marker 220 snugly in place, although the marker 220 may also be relatively easily removed by a user pulling on the marker 220 through the finger cutout 250. In some embodiments, the finger cutout 250 is optional. Further, a friction fit between the inner panel 242 and back panel 230 of the case 204 is also optional, as one or more magnets may be attached to the marker 220 to allow the marker to connect to the mobile device easily as will be described in greater detail below. Both magnets and friction fit may be used in other embodiments to retain the marker 220 in the case 204. Although not shown, a strap or clips or other retaining mechanism may also be used, alone or in combination, to retain the marker 220 in the case 204.

Figure 3:
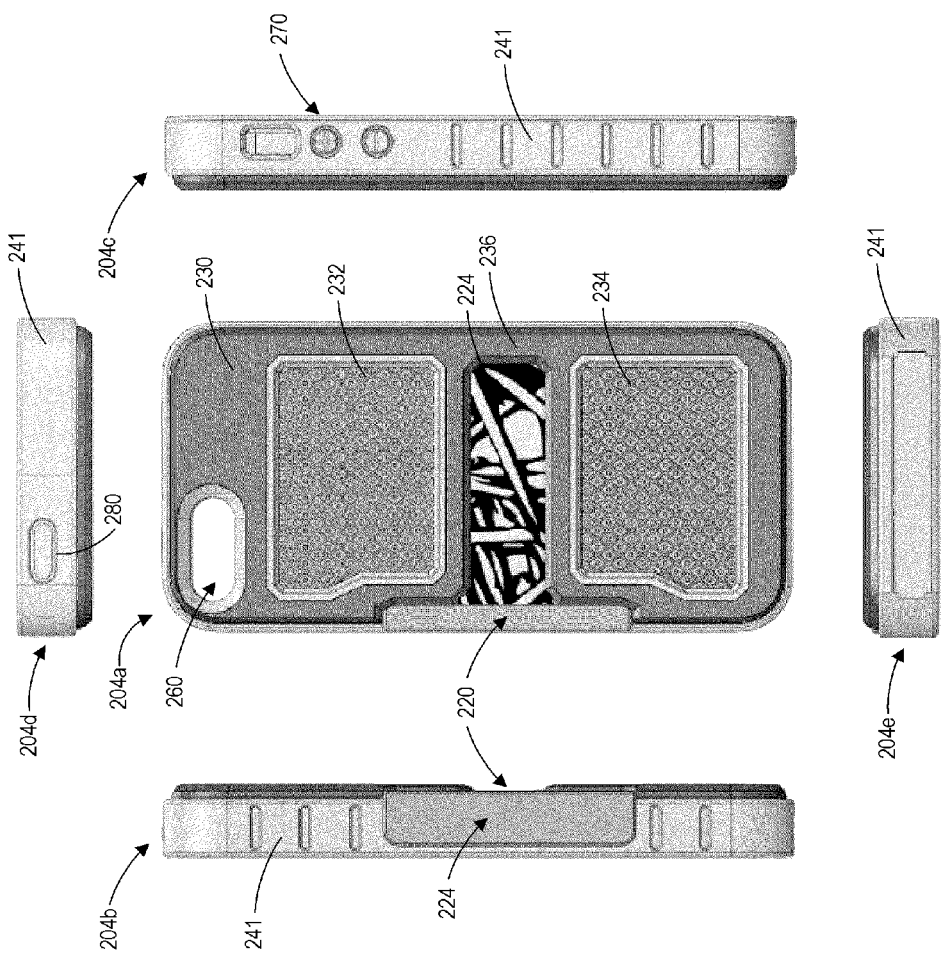
FIG. 3 depicts additional views of the mobile device case and distance marker of FIG. 2.

Turning to FIG. 3, various additional views of the mobile device case 204 and distance marker 220 of FIG. 2 are shown. In contrast with FIG. 2, in FIG. 3, the marker 220 is shown inserted into the case 204. The mobile device case 204 is shown in a rear view 204a, a left side view 204b, a right side view 204c, a top view 204d and a bottom view 204e. In the particular embodiment shown, the marker 220 is inserted into the pocket 240, and in the side view 204b the base 224 is therefore shown on the side of the case 204b. As shown, the base 224 of the marker 220 is flush or approximately flush with the side support 241 of the case 204a. Further, as described above with respect to FIG. 2, the case 204 as shown in the right side view 204c and top view 204d includes depressible button covers 270 and 280 to cover volume control buttons and a power button, among other features.

In other embodiments, instead of having an opaque back panel 230 as shown, the case 204 may include a back panel 230 that is transparent or translucent. A transparent or translucent back panel 230 can allow the distance marker 220 to be seen through the case 204. Consequently, the case 204 may be detached from the mobile device and propped against an object to be measured, and the camera of the mobile device can detect the distance marker 220 in the case to measure distance. In still other embodiments, the tracking image is integrated with the case 204, eliminating the use of a marker 220 entirely. For example, the tracking image 220 can be a sticker or other material that is adhered to the case 204 or that is integrally printed with the case 204. A user can remove the case 204 from the mobile device, set the case 204 near an object to be measured, and activate the measurement application to measure distance to the case 204.

Figure 4:
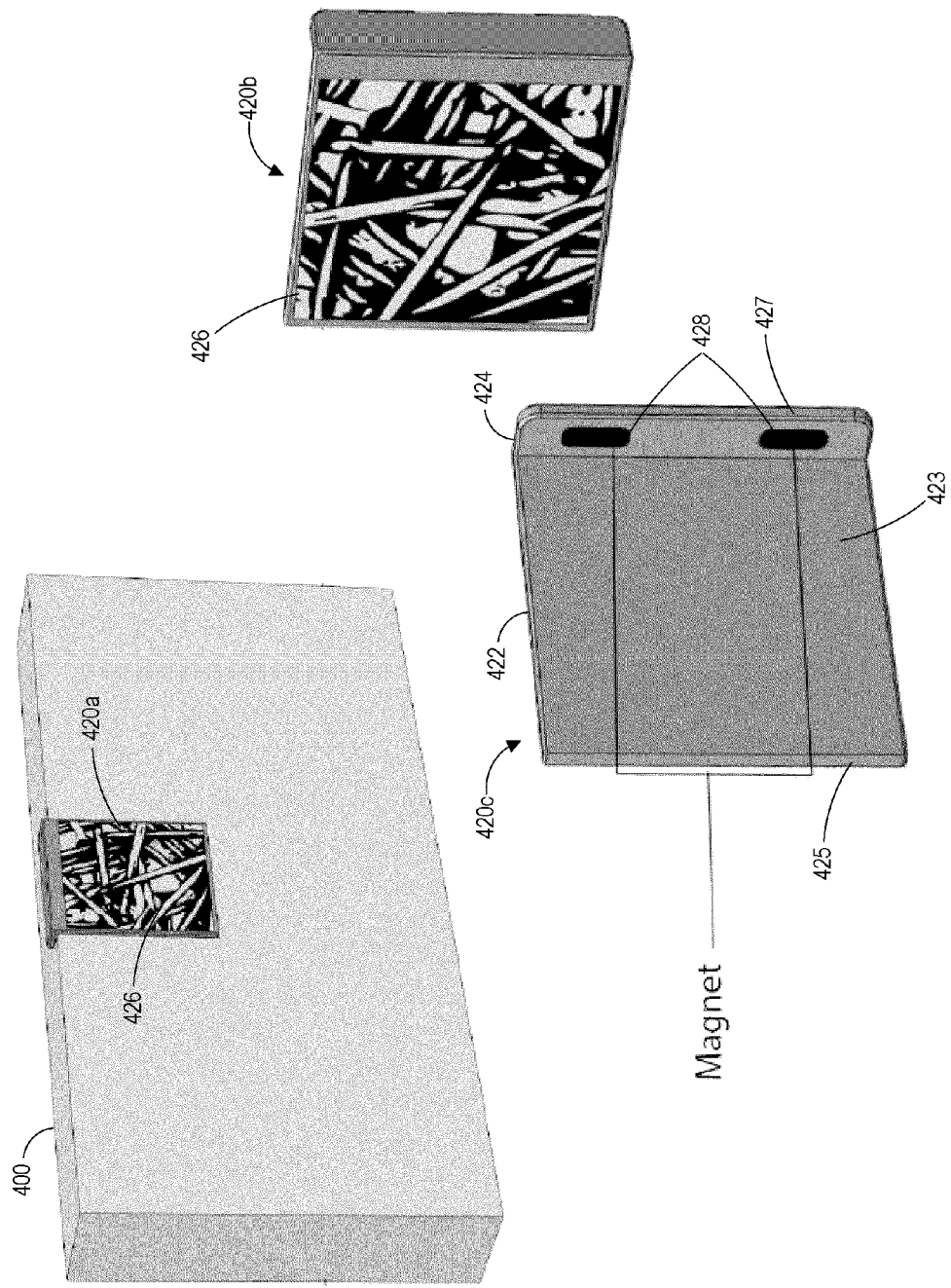
FIG. 4 depicts perspective views of an embodiment of a distance marker and mobile device.

Turning to FIG. 4, example perspective views of an embodiment of a distance marker 420 and a mobile device 400 are shown. In the depicted embodiment, the marker 420 is shown in three different views, including a marker 420a attached to the mobile device 400, a front perspective view of a marker 420b, and a rear perspective view of the marker 420c. The marker 420 includes all the features of the marker 220 and 120 described above.

Like the markers described above, the marker 420 includes a main body 422, a base 424, and a tracking image 426. Advantageously, in the depicted embodiment, an inner surface 423 of the base 424 has magnets 428 disposed thereon. These magnets 428 can magnetically couple with the mobile device 400 when the base 424 of the marker 420 is brought into contact with the mobile device 400. As described above with respect to FIG. 2, a side void 244 in the case 204 exposes a portion of the side of the mobile device, which can therefore come into contact with the magnets 428 of the base 424. For a mobile device that has metal on its side or sides, the magnets 428 can magnetically attract to this metal to secure the marker 420 against the mobile device.

The magnets 428 can be any type of magnet, such as rare-earth magnets for a strong magnetic field and hence tight fit to the mobile device 400. The magnets 428 are thin in one embodiment to avoid causing the marker 420 to protrude from the case 204. For example, the magnets 428 may be less than 1 mm thick, or less than about 2 mm thick, or the like.

In the depicted embodiment, the marker 420 includes a side wall 425 of the main body 422, which can have a thickness of about 1 to 2 mm (or another thickness) to facilitate a flush fit or approximately flush fit with the case 204. As a result, the marker 220 does not protrude beyond the side support 241 of the case 204 in some embodiments. The thickness of the base 424 can be the same as or similar to the thickness of the side wall 425 or may be a different thickness. For example, a side wall 427 of the base 424 can have a thickness of about 1 to 2 mm or less than 1 mm (or more than 2 mm).

The dimensions of the main body 422 can be approximately 2.5 cm in height by 2.5 cm in width, with a thickness described above. In one embodiment, the size of the main body 422 can range from about 2 cm by 2 cm to about 8 cm by 8 cm but may also be smaller or larger. In one embodiment, a smaller marker 420 is used for mobile devices 400 that are smaller, such as phones, and a larger marker 420 can be used for larger mobile devices, such as tablets and laptops.

Although the marker 420 is shown having a main body 422 that is generally square in shape, the main body 422 need not be square but can instead be rectangular, circular, triangular, or any other shape, including a free form shape. In one embodiment, the marker 420 is in the shape of a licensed, branded or copyrighted character, or other whimsical shape to facilitate increased user enjoyment and use of the marker 420.

Figure 5:
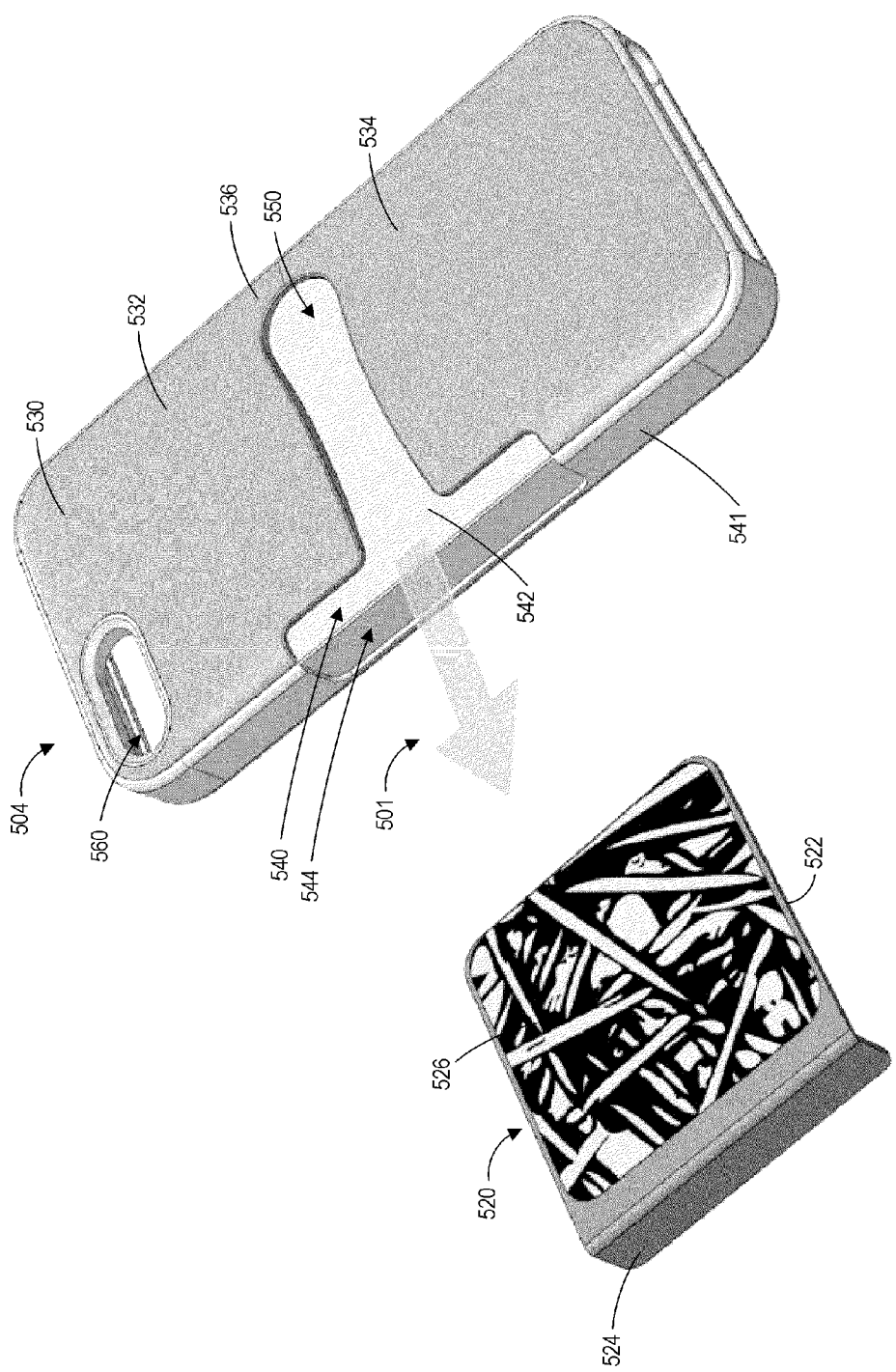
FIG. 5 depicts a side perspective view of another embodiment of a mobile device case and distance marker.
Figure 6:
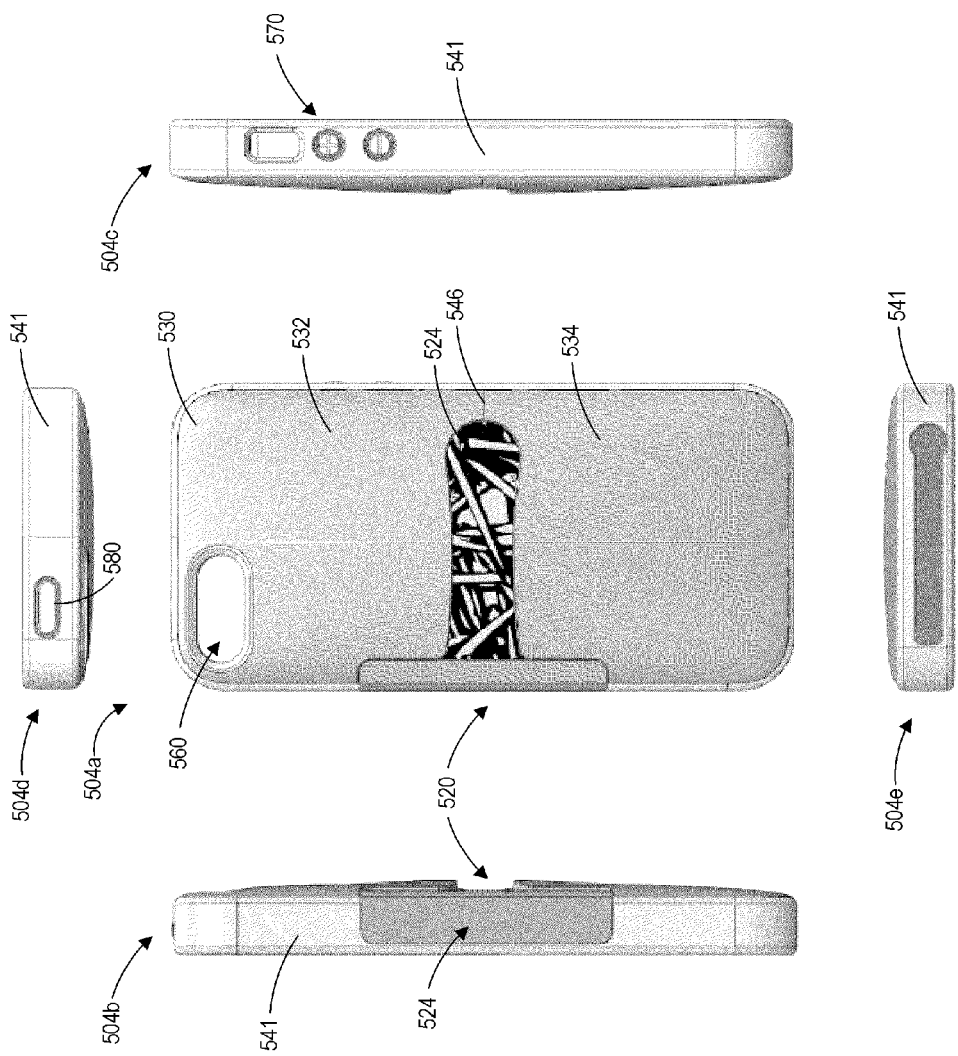
FIG. 6 depicts additional views of the mobile device case and distance marker of FIG. 5.

Turning to FIGS. 5 and 6, another embodiment of a mobile device case 504 and distance marker 520 are shown. The distance marker 520 can include all of the features of the markers 120, 220, 420 described above. For example, the marker 520 includes a main body 522, base 524, and tracking image 526. The marker 520 may also include one or more magnets disposed on any surface thereof (see FIG. 4).

The case 504 can also include most or all of the features of the cases 104, 204 described above. For example, the case 504 includes a back panel 530 having an upper panel 532 and a bottom panel 534 as well as a connecting portion 536. A pocket 540 is defined by the back panel 530 and an inner layer 542 of the case 504, and a side support 541 is also defined around the edge of the case 504. The upper panel 532, bottom panel 534, and connecting portion 536 define a finger cutout 550. The marker 520 may be inserted into the pocket 540 and removed by a user pressing a finger against the marker 520 using the finger cutout 550. Likewise, the case 504 includes an aperture 560 for the camera as well as button covers 570 and 580 as shown in FIG. 6.

Of note, instead of having a side void 244 as in the case 204 of FIG. 2, the case 504 of FIG. 5 includes a side panel 544. The side panel 544 extends downward from the inner panel 542 in place of the side void 244. Magnets or one or more magnets in the marker 520 can magnetize with or through the side panel 544 and/or the inner panel 542 to couple with a mobile device inside the case (not shown). The side panel 544 may be made (in part or in whole) of metal, for instance, to allow magnetic coupling with the marker 520 independently of whether the phone used with the case 504 does or does not have a metal side.

In addition, another difference shown is that the back panel 530 does not include the tactile portions such as the top and bottom portions 232 and 234 of FIG. 2. However, the back panel 530 may be made of material such as a polymeric or plastic material that provides a strong grip for a user.

In FIG. 6 various views of the case 504 are shown which correspond to the same views of the case 504 (i.e., rear view 504a, left side view 504b, right side view 504c, top view 504d, and bottom view 504e) as were shown with respect to the case 204 in FIG. 3.

III. Example Measurement Application

Figure 7:
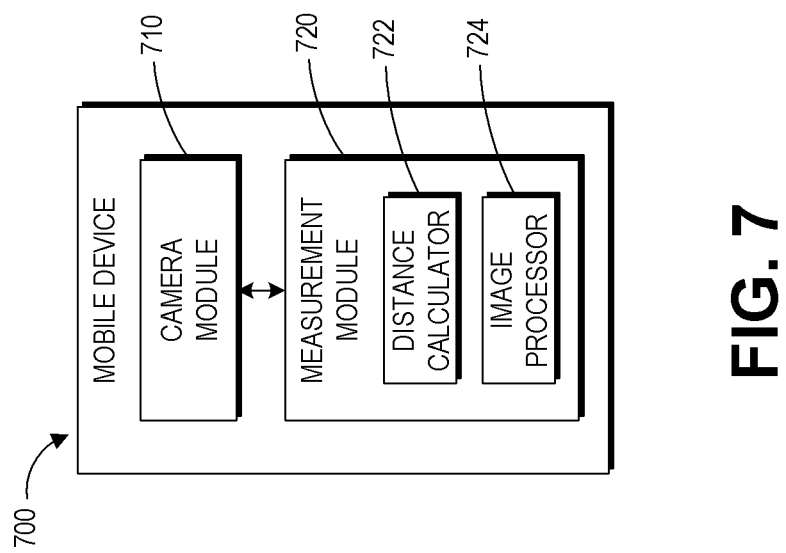
FIG. 7 depicts an embodiment of a mobile device including a camera module and a measurement module.

Turning to FIG. 7, an embodiment of a mobile device 700 is shown. The mobile device 700 can be any of the mobile devices described above. The mobile device 700 may include one or more physical processors able to process instructions that are stored on a computer readable storage medium or the like. The mobile device 700 may also include memory, physical computer storage, and other hardware components.

In the depicted embodiment, the mobile device 700 includes a camera module 710 and a measurement module 720. In general, the camera module 710 and measurement module 720 can include software and/or hardware for implementing their respective features including, but not limited to, software, modules, code, and one or more processors or one or more memory devices. The camera module 710 and the measurement module 720 may each be considered an app or application. In other embodiments, either of the modules 710 and 720 can be implemented in a web browser using hypertext markup language (HTML), cascaded style sheets (CSS), a scripting language such as JavaScript, combinations of the same, or the like.

In certain embodiments, the camera module 710 is a stock camera module provided with the mobile device 700 and captures still images and/or video. The camera module 710 can instead be a modified version of the camera module provided with the mobile device 700. The measurement module 720 can communicate with the camera module 710 to obtain access to images and/or video obtained from the camera module 710. For instance, the measurement module 720 may access video in real time as it is obtained from the camera module 710 or may access still images obtained from the camera module 710 after they are obtained.

The measurement module 720 can compute a distance from the mobile device 700 to a distance marker, such as any of the distance markers described above. The measurement module 720 may compute this distance in real time or substantially near real time based on the real time video frames obtained from the video of the camera module 710. Alternatively, a user may take a picture with the camera module 710, and then the measurement module 720 can calculate the distance shortly thereafter, which may also be considered real time in one embodiment. For instance, the user may take a picture of the distance marker using the camera module 710, and the measurement module 720 may rapidly or immediately calculate the distance from the mobile device 700 to the distance marker in the image captured by the camera module 710.

In the depicted embodiment, the measurement module 720 includes a distance calculator 722 and an image processor 724. The distance calculator 722 can include functionality for calculating distance based on data obtained from the image processor or image processing module 724. The image processing module 724 can include a software library or set of libraries that detect the marker in the image or video frames obtained from the camera module 710. For example, the image processing module 724 can include (or may call) a library provided by any of the image processors described above (such as Vuforia™, Metaio™, D'fusion™, Layar™, or AR Lab™, among others). The image processing module 724 can compare the distance marker in the image or video frame with a stored image of the distance marker provided by the developer or provider of the measurement module 720. The distance calculator 722 can access data provided by the image processor 724 to calculate a distance based on a ratio of the size of the captured distance marker to the stored distance marker (or vice versa), with a greater ratio indicating closer distance (or vice versa). The image processor 724 may provide a distance value in image processing units, which may be represented as pixels (or the width/length of pixels, even though the space between the camera and the marker does not include any actual pixels). In one embodiment, the image processor 724 provides a distance vector, or alternatively, a matrix that includes a column or row that represents a distance vector. The distance calculator 722 can convert this distance vector to standard or common distance units such as English customary units (e.g., feet and inches), metric units, or other units.

Figure 8:
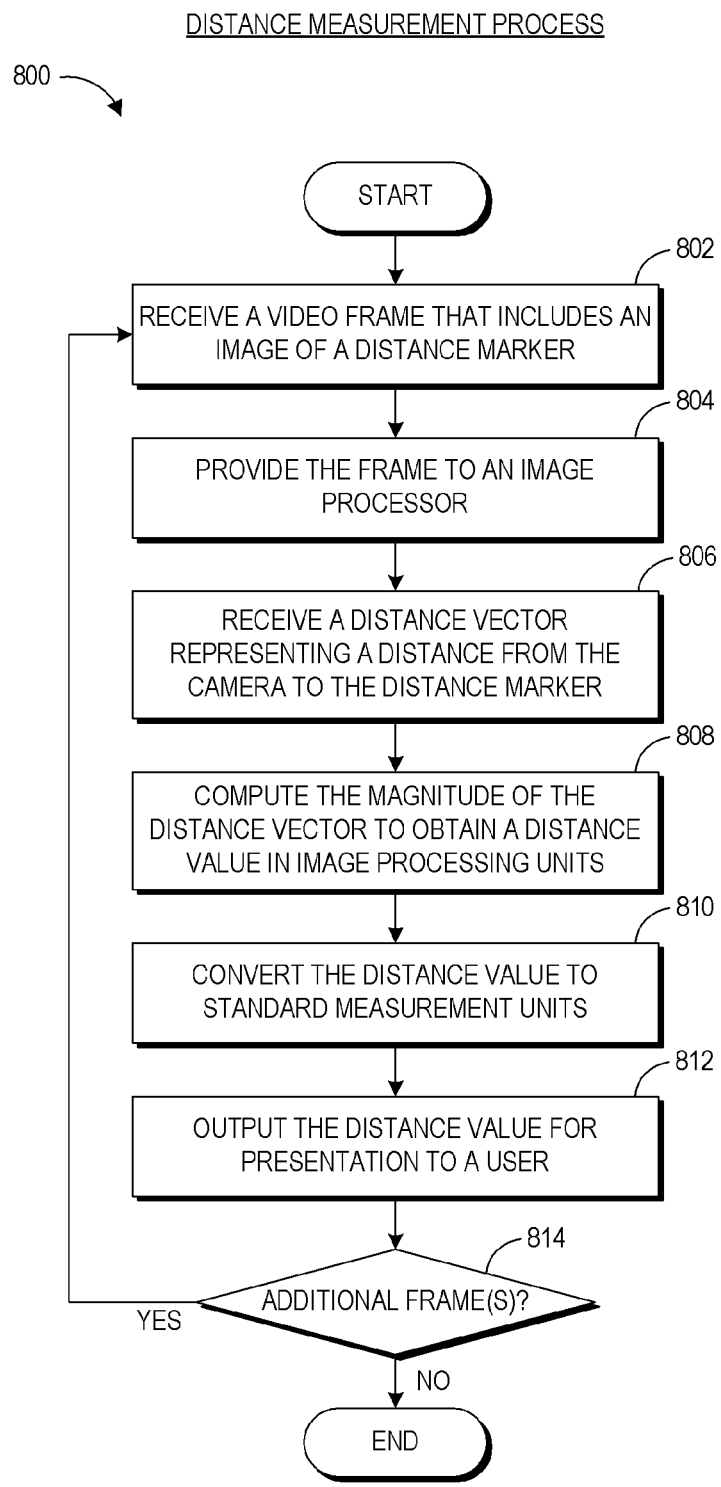
FIG. 8 depicts an embodiment of a distance measurement process that can be implemented by the camera module and the measurement module of FIG. 7.

Turning to FIG. 8, an embodiment of a distance measurement process 800 is shown. The distance measurement process 800 may be implemented by any of the mobile devices described herein, including the mobile device 100, 400, and 700. For example, the distance measurement process may be implemented by the measurement application 720.

At block 802, of the process 800, the measurement module 720 receives a video frame or image that includes an image of a distance marker. The measurement module 720 can receive this image from the camera module 710. At block 804, the measurement module 720 can provide the frame to the image processor 724. In response, the measurement module 720 may receive a distance vector at block 806. The distance vector can represent a distance from the camera to the distance marker, expressed in image processing units.

At block 808, the distance calculator 722 of the measurement module 720 can compute a magnitude of the distance vector to obtain a distance value in image processing units. The distance calculator 722 converts the distance value to standard measurement units at block 810. In one example embodiment, the distance calculator 722 converts the distance vector to standard units using the following example code or the like:

$$\text{float distance=sqrt(position.data[0]*position.data[0]+position.data[1]*position.data[1]+position.data[2]*position.data[2]);} \quad (1)$$

$$\text{float distInft=((distance*0.0328084/40)*8)/9;} \quad (2)$$

$$\text{int ft=distInft;} \quad (3)$$

$$\text{float inches=distInft-ft;} \quad (4)$$

$$\text{inches=(inches)*12.0f;} \quad (5)$$

Expression (1) of the above code operates on a distance vector represented as position.data[0] through position.data[2], which includes x, y, and z coordinate values. The distance vector represents or approximately represents the distance from the camera to the distance marker in one embodiment, where the camera (or the marker) is considered the origin in a Cartesian (or other) coordinate system. Expression (1) computes the Euclidean distance from the distance vector expressed as follows:

$$\text{distance}=\sqrt{(x-x_1)^2+(y-y_1)^2+(z-z_1)^2} \quad (6)$$

However, since the distance vector is represented with respect to the origin ($x_1=0$, $y_1=0$, $z_1=0$), expression (6) and therefore expression (1) reduces to $$\text{distance}=\sqrt{x^2+y^2+z^2} \quad (7)$$

Expression (2) converts the computed distance in expression (1) from image processing units to a standard unit of measure, namely feet in this example. Expression (3) obtains the integer value of the float value obtained in expression (2), and expression (4) subtracts the integer value from the float value to obtain the decimal value of the float value. This decimal value is converted to inches in expression (5). The feet and inches values can then be output by the measurement application 720 to a user. The measurement application 720 can instead compute metric units or other units based on the distance vector in other embodiments.

Figure 9:
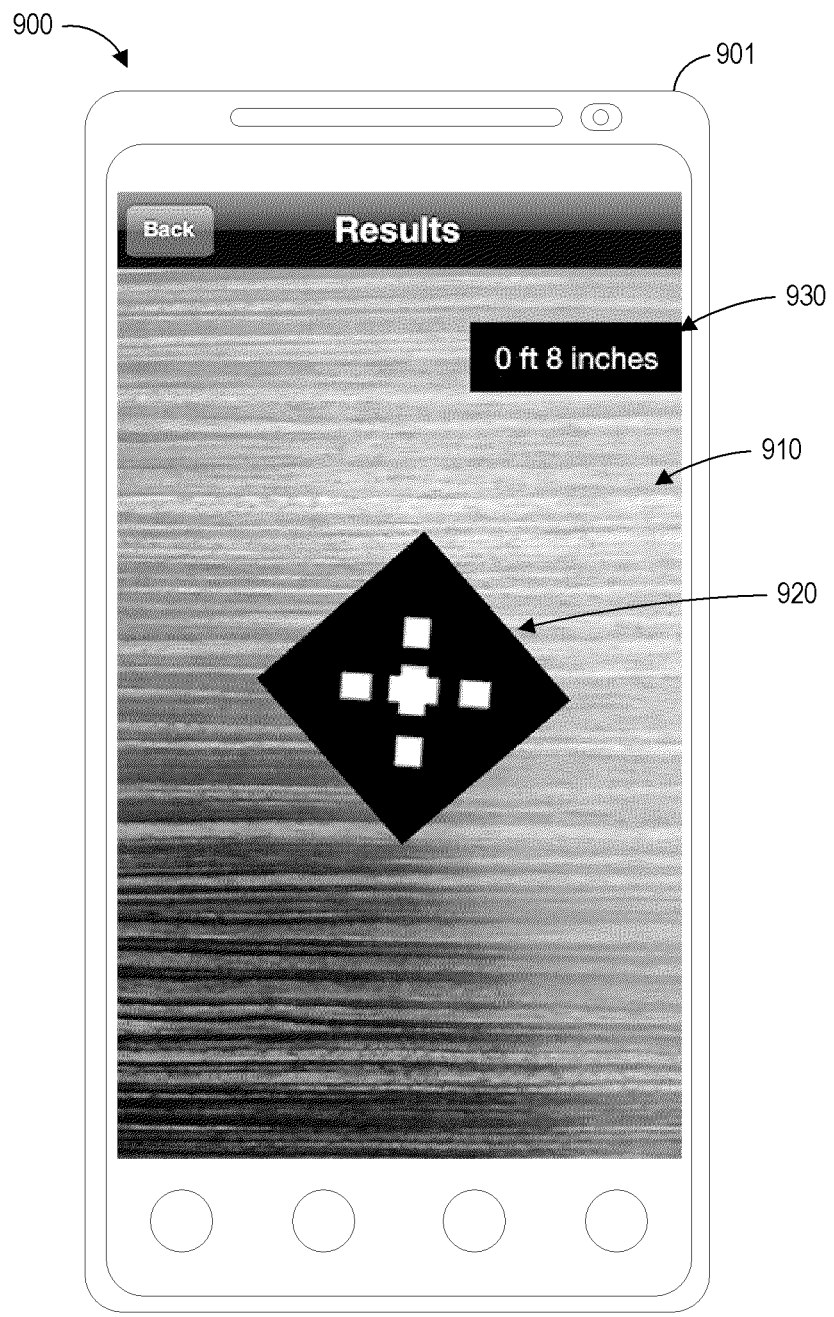
FIGS. 9 and 10 depict example measurement user interfaces of a mobile device.
Figure 10:
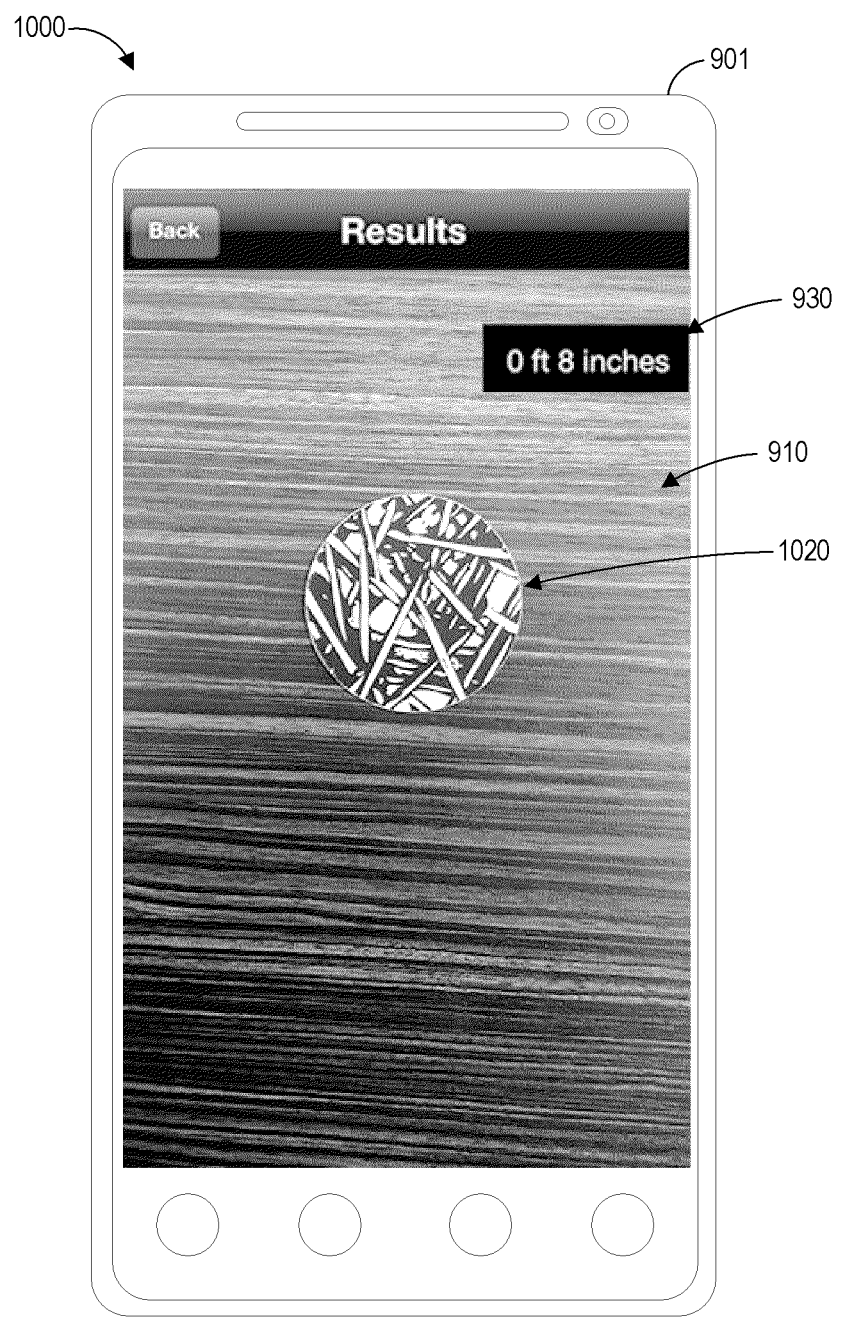

At block 812, the measurement module 720 outputs the distance value for presentation to a user. Example user interfaces that output a distance value are shown in FIGS. 1, 9, and 10 (FIGS. 9 and 10 described below). At block 814, it is determined whether an additional frame or frames are included in the video, and if so, the process 800 loops back to block 802, and otherwise the process 800 ends.

Turning to FIGS. 9 and 10, example user interfaces 900 and 1000 are shown. The user interfaces 900 and 1000 are implemented in a mobile device 901 and depict example output from the measurement application 720 described above with respect to FIG. 7 and block 812 of FIG. 8. In the example user interface 900 results include an image of a marker 920. The marker image is different from the marker images described above. In this embodiment, the measurement application 720 has drawn an image of a cross on the marker, obscuring the marker but indicating where the marker was detected in the image. The measurement application 720 can use OpenGL or another graphics library to draw any image on the marker or elsewhere on the display. For example, the measurement application 720 can use a graphics library to draw a border around the detected marker or the like. In the example user interface 900 shown, the marker 920 is placed on a wood surface 910, and the measurement from the mobile device 901 to the marker 920 is shown in box 930 as being zero feet eight inches.

In the user interface 1000 of FIG. 10, another type of marker 1020 is shown that is circular. The marker 1020 is also placed on the wood surface 910, and the user interface 1000 shows a measurement from the mobile device 901 to the marker 1020 of zero feet eight inches in box 930.

IV. Additional Embodiments

Although the distance marker has been described herein as being coupled with various example cases, the distance marker may also be provided with, attached, integrated (e.g., as a design or sticker), or otherwise coupled with any surface or portion of any mobile device case, including any of the cases described in the following U.S. Patent Applications, the disclosures of which are hereby incorporated by reference in their entirety:

| Application No. | Title | Filing Date | Attorney Docket |
|---|---|---|---|
| 12/540,316 | PROTECTIVE CASES FOR MOBILE DEVICES | Aug. 12, 2009 | 049A |
| 13/489,325 | BATTERY CASE FOR MOBILE DEVICE | Jun. 5, 2012 | 121A |
| 61/655,952 | ACTIVE SUSPENSION CASE FOR A MOBILE DEVICE | Jun. 5, 2012 | 122PR |
| 61/677,432 | ACTIVE SUSPENSION CASE FOR A MOBILE DEVICE | Jul. 30, 2012 | 122PR2 |
| 61/785,755 | PROTECTIVE CASE FOR MOBIL DEVICE | Mar. 14, 2013 | 175PR |
| 61/779,696 | MOBILE DEVICE COVER WITH DISPLAY MODULE | Mar. 13, 2013 | 178PR |
| 61/799,926 | CASE FOR MOBILE DEVICE | Mar. 15, 2013 | 188PR |
| 29/389,864 | CASE | Apr. 18, 2011 | 014DD1 |
| 29/433,387 | CASE | Sep. 28, 2012 | 014DC1 |
| 29/356,799 | CASE | Mar. 2, 2010 | 015DA |
| 29/409,201 | CASE | Dec. 21, 2011 | 023DC1 |
| 29/409,447 | CASE | Dec. 22, 2011 | 024DC1 |
| 29/356,691 | CASE | Mar. 1, 2010 | 028DA |
| 29/356,874 | CASE | Mar. 3, 2010 | 029DA |
| 29/356,879 | CASE | Mar. 3, 2010 | 030DA |
| 29/356,880 | CASE | Mar. 3, 2010 | 031DA |
| 29/356,973 | CASE | Mar. 4, 2010 | 034DA |
| 29/356,974 | CASE | Mar. 31, 2010 | 035DA |
| 29/357,019 | CASE | Mar. 5, 2010 | 036DA |
| 29/356,670 | CASE | Mar. 1, 2010 | 038DA |
| 29/403,835 | CASE | Oct. 11, 2011 | 038DC1 |
| 29/356,692 | CASE | Mar. 1, 2010 | 041DA |
| 29/404,688 | CASE | Oct. 24, 2011 | 041DC1 |
| 29/356,888 | CASE | Mar. 3, 2010 | 042DA |
| 29/404,206 | CASE | Oct. 17, 2011 | 042DC1 |
| 29/356,886 | CASE | Mar. 3, 2010 | 044DA |
| 29/403,830 | CASE | Oct. 11, 2011 | 044DC1 |
| 29/356,890 | CASE | Mar. 3, 2010 | 045DA |
| 29/359,067 | CASE | Apr. 5, 2010 | 048DA |
| 29/408,873 | CASE | Dec. 16, 2011 | 048DC1 |
| 29/344,116 | MOBILE PHONE CASE | Sep. 23, 2009 | 050DA |
| 29/365,705 | CAMERA HOLE INSERT FOR PHONE CASE | Jul. 13, 2010 | 051DA |
| 29/429,550 | CAMERA HOLE INSERT FOR PHONE CASE | Aug. 13, 2012 | 051DC1 |
| 29/385,458 | CASE | Feb. 14, 2011 | 064DA |
| 29/397,566 | CASE | Jul. 18, 2011 | 065DA |
| 29/394,766 | CASE | Jun. 21, 2011 | 087DA |
| 29/412,879 | CASE | Feb. 8, 2012 | 093DA |
| 29/369,069 | CASE | Sep. 1, 2010 | 094DA |
| 29/406,847 | CASE | Nov. 18, 2011 | 094DC1 |
| 29/416,008 | CASE | Mar. 16, 2012 | 095DA |
| 29/412,884 | CASE | Feb. 8, 2012 | 096DA |
| 29/412,885 | CASE | Feb. 8, 2012 | 097DA |
| 29/412,883 | CASE | Feb. 8, 2012 | 099DA |
| 29/412,881 | CASE | Feb. 8, 2012 | 100DA |
| 29/416,006 | CASE | Mar. 16, 2012 | 110DA |
| 29/427,479 | CASE | Jul. 18, 2012 | 133DA |
| 29/427,726 | CASE | Jul. 20, 2012 | 134DA |
| 29/432,914 | CASE | Sep. 21, 2012 | 150DA |
| 29/432,901 | CASE | Sep. 21, 2012 | 151DA |
| 29/433,446 | CASE | Sep. 28, 2012 | 152DA |
| 29/433,226 | CASE | Sep. 27, 2012 | 153DA |
| 29/432,911 | CASE | Sep. 21, 2012 | 155DA |
| 29/432,908 | CASE | Sep. 21, 2012 | 157DA |
| 29/432,897 | PACKAGING | Sep. 21, 2012 | 158DA |
| 29/433,447 | CASE | Sep. 28, 2012 | 159DA |
| 29/433,290 | CASE | Sep. 27, 2012 | 160DA |
| 29/433,293 | CASE | Sep. 27, 2012 | 161DA |
| 29/433,294 | CASE | Sep. 27, 2012 | 162DA |
| 29/432,891 | CASE | Sep. 21, 2012 | 164DA |
| 29/450,274 | CASE | Mar. 15, 2013 | 179DA |
| 29/450,251 | CASE | Mar. 15, 2013 | 180DA |

V. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A case system for an electronic device having a camera, the case system comprising:
    a compartment configured to retentively receive the electronic device;
    a distance marker; and
    a software application installed on the electronic device, wherein the software application is configured to determine a distance between a first location and a second location from a photographical image, taken by the electronic device at the second location, of the distance marker positioned at the first location.

2. The case system of claim 1, wherein the distance marker is removably coupled within a pocket formed into the case system.

3. The case system of claim 1, wherein the image comprises a sticker adhered to the distance marker.

4. The case system of claim 1, wherein the distance marker comprises a magnet configured to magnetically couple the distance marker with the electronic device when the electronic device is operationally retentively received within the compartment.

5. The case system of claim 1, wherein the distance marker comprises intersecting walls.

6. The case system of claim 1, wherein the distance marker includes a magnetized element.

7. A method for measuring distance, the method comprising:
    providing a case for an electronic device;
    providing a distance marker having a tracking image, the distance marker being configured to be coupled to the case;
    positioning the distance marker at a selected first location;
    photographically capturing the image of the distance marker at a second location using the electronic device; and
    analyzing the captured image using the electronic device to determine a distance between the first and second locations.

8. The method of claim 7, further comprising:
    attaching the distance marker to the case.

9. The method of claim 7, further comprising:
    displaying the distance to a user using the electronic device.

10. A method for measuring distance, the method comprising:
    preparing a case configured to receive an electronic device, the case having a pocket configured to receive a distance marker;
    installing a software application to the electronic device;
    removing the distance marker and positioning the distance marker at a first location;
    detecting an image associated with the distance marker at a second location using the electronic device; and
    calculating a distance from the first location to the second location using the electronic device.

11. The method of claim 10, further comprising:
    displaying the distance to a user using the electronic device.

* * * * *